United States Patent [19]

Martin

[11] Patent Number: 4,825,190

[45] Date of Patent: Apr. 25, 1989

[54] SAFETY SYSTEM FOR PREVENTING THE UNAUTHORIZED USE OF POWERED LIFTGATES

[75] Inventor: Paul H. Martin, Toronto, Canada

[73] Assignee: Diesel Equipment Limited, Toronto, Canada

[21] Appl. No.: 253,337

[22] Filed: Oct. 3, 1988

Related U.S. Application Data

[63] Continuation of Ser. No. 165,446, Feb. 1, 1988, abandoned, which is a continuation of Ser. No. 911,740, Sep. 26, 1986, abandoned.

[51] Int. Cl.[4] .............................................. B60Q 1/26
[52] U.S. Cl. .................................. 340/471; 307/10.1; 307/10.8; 315/80
[58] Field of Search ................... 340/53, 22, 52 R, 54, 340/70, 74, 78, 81 R, 81 F; 307/10 LS, 10 R, 326, 328; 315/80; 200/61.62, 50 C; 180/271, 324; 414/921

[56] References Cited

U.S. PATENT DOCUMENTS

| | | | |
|---|---|---|---|
| 2,360,227 | 10/1944 | Hemphill | 340/74 |
| 2,384,689 | 9/1945 | Moore | 340/74 |
| 3,516,525 | 6/1970 | Skaggs | 340/81 R X |
| 3,789,357 | 1/1974 | Fritz, Jr. | 340/53 |
| 3,893,697 | 7/1975 | Blitz et al. | 414/921 X |
| 4,010,814 | 3/1977 | Adams | 180/271 |
| 4,455,462 | 6/1984 | DeLucia | 200/61.62 |

FOREIGN PATENT DOCUMENTS 2549708  5/1977  Fed. Rep. of Germany ........ 315/80

*Primary Examiner*—Joseph A. Orsino
*Assistant Examiner*—Brian R. Tumm
*Attorney, Agent, or Firm*—Fetherstonhaugh & Co.

[57] ABSTRACT

A motor vehicle such as a truck or a van which has a powered liftgate and which includes a liftgate electrical circuit for activating the liftgate to raise and lower the liftgate and a hazard warning circuit for operating the pulsating hazard warning light system of the vehicle, is fitted with a power interrupting device in the liftgate circuit which is responsive to the operation of the hazard warning circuit to render the liftgate circuit operable when the hazard warning circuit is operating.

5 Claims, 1 Drawing Sheet

SAFETY SYSTEM FOR PREVENTING THE UNAUTHORIZED USE OF POWERED LIFTGATES

This application is a continuation, of application Ser. No. 07/165,446, filed 02/01/88 now abandoned, which is a continuation of Ser. No. 06/911,740 filed 09/26/86, now abandoned.

FIELD OF INVENTION

This invention relates to motor vehicles such as trucks or vans which have powered liftgate systems. In particular, this invention relates to motor vehicles which have an electrically activated hazard warning system such as the "flasher" system which causes the parking lights of the vehicle to flash on and off.

DESCRIPTION OF PRIOR ART

Powered tailgate systems have been in use for many years and various attempts have been made to provide a control system which would prevent use of the liftgate when not directly supervised by the vehicle operator. It is, however, necessary to provide a control for the powered liftgate which can be operated by the vehicle operator when the powered liftgate is in the full view of the operator. Generally the liftgate is located at the back of the vehicle at a point remote from the driver's cab with the result that any on/off switch which may be provided in the liftgate system and which is located in the driver's cab is likely to be left in the on position by the driver so as to avoid the inconvenience of having to go back and forth between the cab and the rear of the vehicle.

Motor vehicles which are presently manufactured for use with powered liftgates include a hazard warning system which provides flashing lights which serve to indicate to approaching traffic that the vehicle represents a hazard. In some hazard warning systems, an audible pulsating signal is also generated.

SUMMARY OF INVENTION

I have found that if the electrical circuit which is used to power the hazard warning devices is also used to control the electrical circuit which powers the liftgate system, the vehicle operator is not likely to leave the hazard warning system in an active condition in order to minimize the inconvenience resulting from the fact that the powerlift system is not always live.

The hazard warning system of most motor vehicles is one in which an intermittent signal is generated in order to cause the warning lamps to flash off and on. This intermittent signal is not suitable in itself for the purposes of controlling the liftgate circuit because the liftgate system requires a continuous supply of power in order to permit it to operate effectively.

To achieve integration of the hazard warning system and the liftgate system, I provide a means for generating a continuous signal from the hazard warning signal which is then used as a control signal which permits operation of the liftgate circuit.

It is an object of the present invention to control the operation of the liftgate system so that it can be activated when the hazard warning system is active.

According to one aspect of the present invention, there is provided in a motor vehicle which has a powered liftgate and which includes a liftgate electrical circuit for activating the liftgate to raise and lower the liftgate and a hazard warning circuit for operating the pulsating hazard warning light system of the vehicle, the improvement of a relay in the liftgate circuit, said relay being responsive to the operation of the hazard warning circuit to render the liftgate circuit operable when the hazard warning circuit is operating.

According to a further aspect of the present invention, there is provided in a motor vehicle which has a powered liftgate and which includes a liftgate electrical circuit for activating the liftgate to raise and lower the liftgate and a hazard warning circuit for operating the pulsating hazard warning light system of the vehicle, the improvement of a normally open relay in said liftgate circuit, and means communicating between said relay and said hazard warning circuit to cause the relay to close when the hazard warning circuit is complete and the hazard warning system is in operation.

BRIEF DESCRIPTION OF THE DRAWINGS

The invention will be more clearly understood after reference to the following detailed specification read in conjunction with the drawings wherein.

PREFERRED EMBODIMENT

Figure 1:
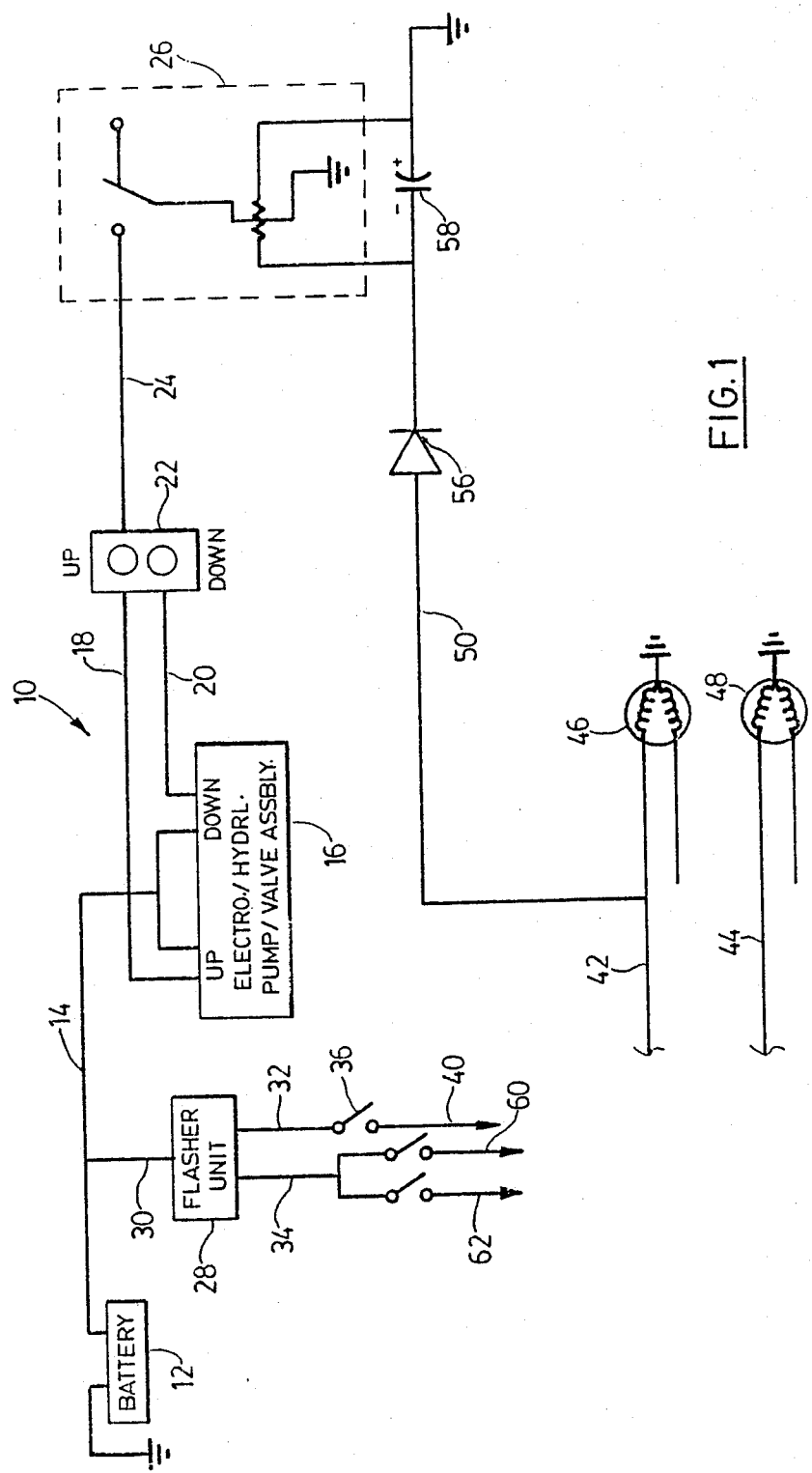
FIG. 1 is a diagram illustrating one system for communicating between a hazard warning circuit and the liftgate circuit.

With reference to FIG. 1 of the drawings, the reference numeral 10 refers generally to a liftgate electrical circuit. The power source is a battery 12 which is connected through a line 14 to the electro-hydraulic pump/valve assembly 16 which serves to power the liftgate. The electro-hydraulic pump/valve assembly 16 is of a conventional construction and will not therefore be described in detail. The lines 18 and 20 serve to connect the assembly 16 to a push button switch 22. The line 24 connects the push button switch 22 to a relay generally identified by the reference numeral 26. The relay 26 is normally open and the liftgate electrical circuit is not complete until the relay is closed.

The hazard warning circuit includes a conventional flasher unit 28 which is connected to the line 14 by means of a line 30. The flasher unit 28 is the conventional flasher unit used for the purposes of generating an intermittent electrical signal which is transmitted through the line 32 to the hazard warning light and through the line 34 to the turning signals. The hazard warning circuit is activated by closing the switch 36. The line 40 which leads from the switch 36 is connected in a conventional manner to the lines 42 and 44 which are connected to the right rear hazard warning lamp 46 and the left rear hazard warning lamp 48 respectively.

The relay 26 is made responsive to the operation of the hazard warning circuit by providing a line 50 which is connected to the line 42 and the relay 26. Because the signal which is generated in the line 42 is an intermittent signal, a capacitor 58 is provided in the line 50 for the purposes of providing a continuous signal to the relay 26. The relay 26 is connected to the line 50 across the capacitor 58. A diode 56 is provided in the line 50 in advance of the capacitor 58.

It will be noted that as is conventional in the electrical circuit of a motor vehicle such as a truck, the lines 60 and 62 which extend from the turn signal switches are connected to the lines 42 and 44 respectively with the result that the relay 26 will also respond to the intermittent signal generated by activating the turn signals. This is not, however, considered to be a major disadvantage because the turn signals themselves constitute a hazard warning system and also include both a visual and audible signal in the driver's compartment which the driver will not normally tolerate.

In many applications, the lamps 46 and 48 may also be activated by a switch associated with the foot brake of the vehicle. It follows that in some circumstances, the relay 26 may be activated by the operation of the foot brake. Again, however, this is not considered to be a significant drawback because the driver must be present in the vehicle in order to activate the foot brake switch and would therefore be in a position to determine whether any unauthorized persons were attempting to operate the liftgate system.

In use, when the operator wishes to operate the liftgate system, the first step is to close the hazard switch 36 in order to activate the hazard warning circuit. The relay 26 is then automatically activated. It is then possible for the operator to raise or lower the liftgate by operating the up or down button of the push button device 22.

From the foregoing, it will be apparent that the present invention provides a simple and efficient safety switching system in the liftgate circuit of a powered liftgate system which will provide a clear indication that the liftgate system is in a condition which will permit it to be operated by its own operating switch. This system also serves to discourage the practice of bypassing additional safety switches by simply setting the switch in the closed position because in this case, it would involve activating the hazard warning circuit and thereby activating the hazard warning lights and audible signal devices which are present in the driver's compartment.

It would also be apparent that the present invention can be incorporated into any number of existing vehicles without difficulty.

These and other advantages of the present invention will be apparent to those skilled in the art.

I claim:

1. A safety system for indicating the operative condition of the liftgate of a motor vehicle which is also provided with a hazard warning system incorporating one or more lights which are controlled by a flasher and wherein the liftgate and hazard warning system are powered by an electrical power source comprising, a first electrical circuit connecting the hazard warning system to the electrical power source so that the lights are activated by the flasher, first switch means for activating said first electrical circuit so as to operate the lights through the flasher, a second electrical circuit connecting said liftgate to said electrical power source and said first electrical circuit, said second electrical circuit including relay means for connecting said second electrical circuit to said first electrical circuit, said relay means being connected intermediate said first switch means and one of the lights of the hazard warning system of said first electrical circuit, said second electrical circuit further including a second switch means for controlling the operation of the liftgate, said second electrical circuit being activated to supply power through said second switch means when said relay means is activated to close said second electrical circuit through said first electrical circuit in response to the activation of said first circuit through said first switch means whereby the operation of the liftgate by said second switch means is only possible when said first switch means is operable to activate the hazard warning system.

2. The safety system of claim 1 in which said relay means is a normally open relay.

3. The safety system of claim 1 including continuous signal electrical means mounted intermediate said relay means and said first electrical circuit, said continuous signal electrical means insuring constant power to flow through said relay means regardless of the condition of the flasher.

4. The safety system of claim 3 in which said continuous signal electrical means includes a diode and capacitor connected in series with said relay means.

5. The safety system of claim 4 wherein said hazard warning system includes front and rear lights, said one of said lights of said hazard warning system being a rear light.

* * * * *